(12) United States Patent
Lee et al.

(10) Patent No.: US 12,175,722 B2
(45) Date of Patent: Dec. 24, 2024

(54) CONNECTED COMPONENT ANALYSIS METHOD WHICH CAN REUSE LABEL

(71) Applicant: PixArt Imaging Inc., Hsin-Chu (TW)

(72) Inventors: Joon Chok Lee, Penang (MY); Zi Hao Tan, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 399 days.

(21) Appl. No.: 17/553,833

(22) Filed: Dec. 17, 2021

(65) Prior Publication Data

US 2023/0196717 A1  Jun. 22, 2023

(51) Int. Cl.
*G06V 10/44* (2022.01)
*G06T 7/11* (2017.01)

(52) U.S. Cl.
CPC ............. *G06V 10/457* (2022.01); *G06T 7/11* (2017.01)

(58) Field of Classification Search
CPC ................................ G06V 10/457; G06T 7/11
See application file for complete search history.

(56) References Cited

U.S. PATENT DOCUMENTS

2007/0253623 A1* 11/2007 Ohira ............... G06V 30/18076
382/218
2014/0119657 A1* 5/2014 Gupta ..................... G06T 7/187
382/180

\* cited by examiner

*Primary Examiner* — Vu Le
*Assistant Examiner* — Winta Gebreslassie
(74) *Attorney, Agent, or Firm* — Winston Hsu

(57) ABSTRACT

A connected component analysis (CCA) method, which can use labels repeatedly, comprising: defining a label pattern comprising a label and a plurality of neighboring labels; setting a center label of a current pixel of a target binary image according to a binary value of the current pixel and the neighboring pixels; setting at least two of the neighboring labels according to whether the current pixel is in any one of a first row, a first column and a last column; and recording the center label to a label buffer. Labels for marking pixels of the target binary image are first center labels, and then are second center labels, and are the first center labels again after the labels are the second center labels.

17 Claims, 15 Drawing Sheets

| 0 | 0 | 0 | 0 | 0 | 0 | 1 | 1 | 1 | 1 | 0 | 0 | 0 | 0 | 2 | 2 |
|---|---|---|---|---|---|---|---|---|---|---|---|---|---|---|---|
| 0 | 0 | 0 | 0 | 1 | 1 | 1 | 1 | 0 | 0 | 0 | 0 | 2 | 2 | 2 | 2 |
| 0 | 0 | 1 | 1 | 1 | 1 | 0 | 0 | 0 | 0 | 2 | 2 | 2 | 2 | 0 | 0 |
| 1 | 1 | 1 | 1 | 0 | 0 | 0 | 0 | 2 | 2 | 2 | 2 | 0 | 0 | 0 | 0 |
| 1 | 1 | 0 | 0 | 0 | 0 | 2 | 2 | 2 | 2 | 0 | 0 | 0 | 0 | 3 | 3 |
| 0 | 0 | 0 | 0 | 2 | 2 | 2 | 2 | 0 | 0 | 0 | 0 | 3 | 3 | 3 | 3 |
| 0 | 0 | 2 | 2 | 2 | 2 | 0 | 0 | 0 | 0 | 3 | 3 | 3 | 3 | 0 | 0 |
| 2 | 2 | 2 | 2 | 0 | 0 | 0 | 0 | 3 | 3 | 3 | 3 | 0 | 0 | 0 | 0 |
| 2 | 2 | 0 | 0 | 0 | 0 | 3 | 3 | 3 | 3 | 0 | 0 | 0 | 0 | 4 | 4 |
| 0 | 0 | 0 | 0 | 3 | 3 | 3 | 3 | 0 | 0 | 0 | 0 | 4 | 4 | 4 | 4 |
| 0 | 0 | 3 | 3 | 3 | 3 | 0 | 0 | 0 | 0 | 4 | 4 | 4 | 4 | 0 | 0 |
| 3 | 3 | 3 | 3 | 0 | 0 | 0 | 0 | 4 | 4 | 4 | 4 | 0 | 0 | 0 | 0 |
| 3 | 3 | 0 | 0 | 0 | 0 | 4 | 4 | 4 | 4 | 0 | 0 | 0 | 0 | 5 | 5 |
| 0 | 0 | 0 | 0 | 4 | 4 | 4 | 4 | 0 | 0 | 0 | 0 | 5 | 5 | 5 | 5 |
| 0 | 0 | 4 | 4 | 4 | 4 | 0 | 0 | 0 | 0 | 5 | 5 | 5 | 5 | 0 | 0 |
| 4 | 4 | 4 | 4 | 0 | 0 | 0 | 0 | 5 | 5 | 5 | 5 | 0 | 0 | 0 | 0 |

| Label (Lj) | FeatureTable (Area) |
|---|---|
| 1 | 18 |
| 2 | 32 |
| 3 | 32 |
| 4 | 30 |
| 5 | 14 |

FIG. 15

CONNECTED COMPONENT ANALYSIS METHOD WHICH CAN REUSE LABEL

BACKGROUND OF THE INVENTION

1. Field of the Invention

The present invention relates to a CCA (Connected Component Analysis) method, and particularly relates to a CCA method which can reuse labels and can replace labels in the label buffer when collisions occur.

2. Description of the Prior Art

Various CCA methods are described in prior arts to extract features from connected components (or named object, blob) from an input binary image. These features include area, bounding boxes and centroid. For real-time application, a fast (single pass without interrupting input streaming data flow) and efficient (minimal hardware resources) CCA design is crucial in hardware implementation. However, the CCA methods in prior art could not reuse labels, thus needs a large label buffer. Also, the CCA methods in prior art need a memory for storing translator, merger or collision table, for handling label collisions.

SUMMARY OF THE INVENTION

One objective of the present invention is to provide a CCA method which can reuse labels, and can handle label collision without increasing a size of the label buffer.

One embodiment of the present invention provides a connected component analysis (CCA) method, which can use labels repeatedly, comprising: defining a label pattern comprising a center label and a plurality of neighboring labels; setting a label of a current pixel of a target binary image according to a binary value of the current pixel and the neighboring pixels; setting at least two of the neighboring labels according to whether the current pixel is in any one of a first row, a first column and a last column; and recording the center label to a label buffer. Labels for marking pixels of the target binary image are first center labels, and then are second center labels, and are the first center labels again after the labels are the second center labels [We do not quite understand this sentence that was repeated throughout the document: Can you give us an example of the first center labels and second center labels].

The CCA method can further comprise: recording numbers respectively for different center labels [For the term "an image with specific binary value" mentioned throughout the document: Is this term referring to a blob within the target binary image? A blob within a target binary image refers to group of pixels that are connected with pixel value=1].

The CCA method can further comprise: recording centroid reference values for different center labels; computing a centroid of an image with a specific binary value according to the centroid reference values in the target binary image.

The CCA method can further comprise: recording bounding reference values for different center labels.

In view of above-mentioned embodiments, the label can be reused, and the label collision can be handled without increasing a size of the label buffer.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5-FIG. 10 are schematic diagrams illustrating examples of the CCA method illustrated in FIG. 1-FIG. 4.

FIG. 15 is a processing result of a binary image processed by the CCA method disclosed by the present invention.

DETAILED DESCRIPTION

Several embodiments are provided in following descriptions to explain the concept of the present invention. The method in following descriptions can be executed by programs stored in a non-transitory computer readable recording medium such as a hard disk, an optical disc or a memory. For example, the programs can be executed by a processing circuit. Additionally, the term "first", "second", "third" in following descriptions are only for the purpose of distinguishing different one elements, and do not mean the sequence of the elements.

FIG. 1-FIG. 4 are schematic diagrams illustrating a CCA method according to one embodiment of the present invention. FIG. 1-FIG. 4 correspond to the examples illustrated in FIG. 5-FIG. 10, which illustrates a 3×8 target binary image with 8-connectivity. Also, the embodiments illustrated in FIG. 1-FIG. 4 uses a label pattern LP1 illustrated at upper right part of FIG. 1. Lj in the label pattern LP1 means a label of a current pixel which is being processed, and can be named as a center label. La, Lb, Lc, Ld are neighboring labels which may be used to determine Lj. Specifically, La is a top left label of Lj, Lb is a top label of Lj, Lc is a top right label of Lj, and Ld is a left label of Lj.

Also, the value of Lj may be used to determine at least one of La, Lb, Lc, Ld. Furthermore, La, Lb, Lc, Ld may affect each other. Please note, the flows in FIG. 1 correspond to the label pattern LP1 and 3×8 target binary image with 8-connectivity. However, the flows can be varied correspond to the target binary image to be processed and different label patterns, based on the concept disclosed in FIG. 1.

Figure 1:
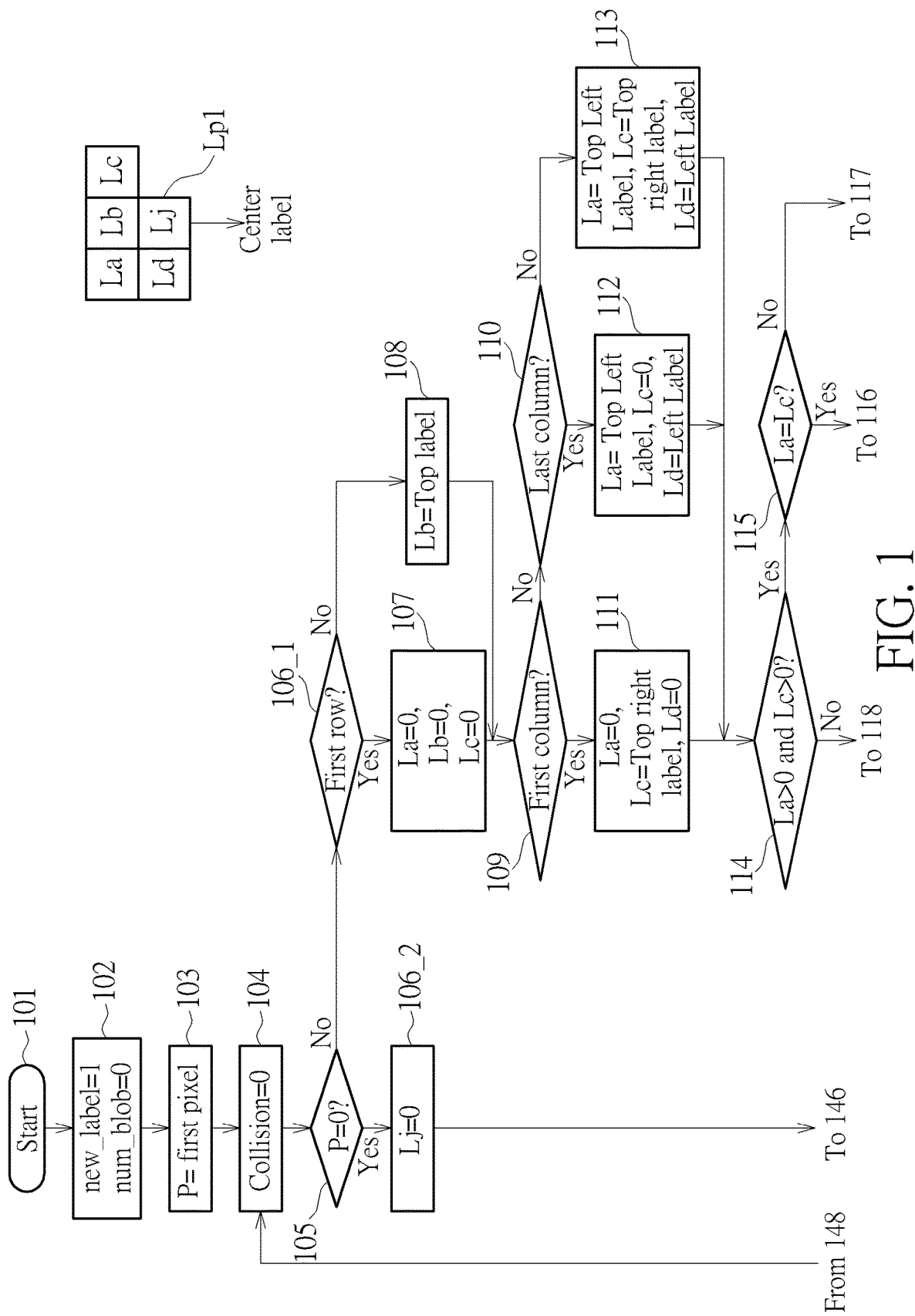
FIG. 1-FIG. 4 are schematic diagrams illustrating a CCA method according to one embodiment of the present invention.

FIG. 1 comprises following steps:

Step 101
  Start.
Step 102
  Set
  new_label=1
  num_blob=0
  Blob means the connected components.
Step 103
  Set
  P=a pixel value of the first pixel
Step 104
  Set Collision=0
  In one embodiment, collision means some specific neighboring labels have different values besides 0 [FIG. 1: Arrow from 148 should be connected to 104, not 105].
Step 105
  Determine if P=0, go to step 106_1 if the answer is no, and go to step 106_2 if the answer is yes [FIG. 1: Arrow from 148 should be connected to 104, not 105].
Step 106_1
  Determine if a current pixel is in a first row, go to step 107 if the answer is yes, and go to step 108 if the answer is no.

Figure 2:
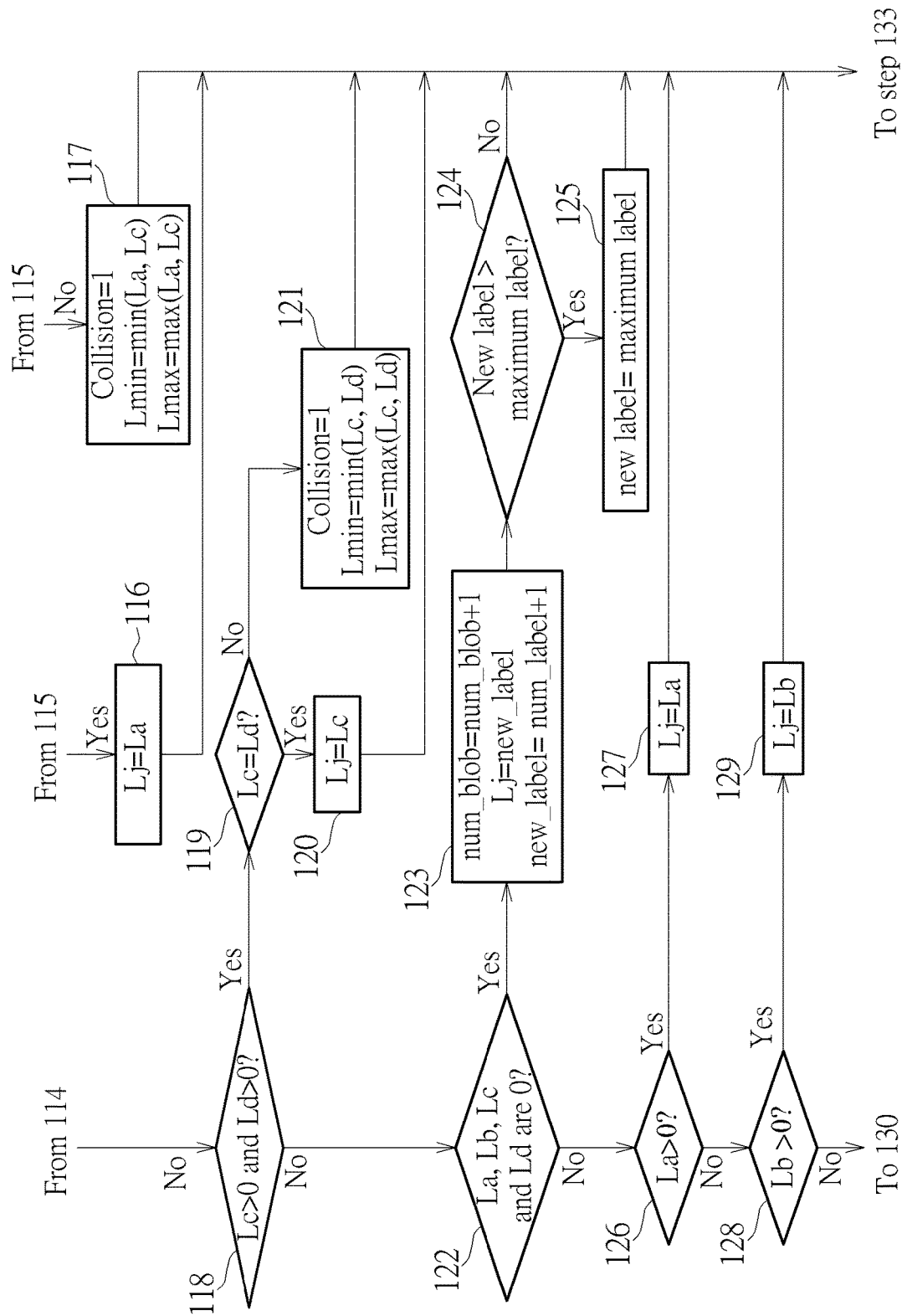

Step 106_2
  Set Lj=0
Step 107
  Set La=0, Lb=0, Lc=0
Step 108
  Set Lb=Top label.
  The top label means a top label of Lj stored in a label buffer [In FIG. 1, the line connecting Step 108 to Step 109 is missing].
Step 109
  Determine if the current pixel is in a first column, go to step 111 if the answer is yes, and go to step 110 if the answer is no.
Step 110
  Determine if the current pixel is in a last column, go to step 112 if the answer is yes, and go to step 113 if the answer is no.
Step 111
  Set La=0, Lc=Top right label, Ld=0
  The top right label means a top right label of Lj stored in the label buffer.
Step 112
  Set La=Top Left Label, Lc=0, Ld=Left Label
  The top left label means a top left label of Lj stored in the label buffer.
  The left label means a left label of Lj stored in the label buffer.
Step 113
  Set La=Top Left Label, Lc=Top right label, Ld=Left Label
Step 114
  Determine if La>0 and Lc>0, go to step 115 if the answer is yes, and go to step 118 if the answer is no.
Step 115
  Determine if La=Lc, go to step 116 if the answer is yes, and go to step 117 if the answer is no.
  FIG. 2 comprises following steps, which follow the steps illustrated in FIG. 1:
Step 116
  Set Lj=La
Step 117
  Set
  Collision=1
  Lmin=min(La, Lc)
  Lmax=max(La, Lc)
Step 118
  Determine if Lc>0 and Ld>0, go to step 119 if the answer is yes, and go to step 122 if the answer is no.
Step 119
  Determine if Lc=Ld, go to step 120 if the answer is yes, and go to step 121 if the answer is no.
Step 120
  Set Lj=Lc
Step 121
  Set Collision=1
  Lmin=min(Lc, Ld)
  Lmax=max(Lc, Ld)
Step 122
  Determine if La, Lb, Lc and Ld are 0, go to step 123 if the answer is yes, and go to step 126 if the answer is no.
Step 123
  Set
  num_blob=num_blob+1
  Lj=new_label
  new_label=num_label+1

Step 124
  Determine if the new label (the new label set in step 123) is larger than a maximum label, go to step 125 if the answer is yes, and go to step 133 if the answer is no.
Step 125
  Set the new label to be a value of a maximum label stored in the label buffer.
Step 126
  Determine if La is larger than 0, go to step 127 if the answer is yes, and go to step 128 if the answer is no.
Step 127
  Set Lj=La
Step 128
  Determine if Lb is larger than 0, go to step 129 if the answer is yes, and go to step 130 if the answer is no.
Step 129
  Set Lj=Lb
  FIG. 3, FIG. 4 comprises following steps, which follow the steps illustrated in FIG. 2:
Step 130
  Determine if Lc is larger than 0, go to step 131 if the answer is yes, and go to step 132 if the answer is no.
Step 131
  Set Lj=Lc
Step 132
  Set Lj=Ld
Step 133
  Determine if Collision=1, go to step 134 if the answer is yes, and go to step 141 if the answer is no.
Step 134
  Set Lj to Lmin
Step 135
  Replace all Lmax in the label buffer to Lmin.
  Lmax means the maximum label (s) of specific ones of neighboring labels, and Lmin means the minimum label(s) of specific ones of the neighboring labels.
Step 136
  Replace all (new_label−1) in the label buffer with Lmax [FIG. 3: The word "Replace" is missing].
  For example, if the new_label is 2, than all labels 1 in the label buffer are replaced with Lmax.
Step 137
  Set Featsize [Lmin]=FeatSize[Lmin]+FeatSize[Lmax]+1
  Set Featsize [Lmax]=FeatSize [new label−1]
  Set FeatSize [new label−1]=0
  These steps are applied for computing numbers respectively for different center labels, to compute sizes for different center labels [Actually all the blobs within the target binary image are having the same binary value of "1". The size computed here refer to the blobs size within the binary image, where each blob has its own label and size]. Other steps having FeatSize are for the same purpose.
Step 138
  Set
  FeatCent [Lmin]=FeatCent[Lmin]+FeatCent[Lmax]+[row, col] [FIG. 4: FeatCent instead of FeatCen]
  FeatCent [Lmax]=FeatCent [new_label−1]
  FeatCent [new_label−1]=0
  [row, col] means a row address and a column address of the current pixel.
  These steps are applied for recording centroid reference values for different center labels [Similar comment for Step 137]. Other steps having FeatCent are for the same purpose.
Step 139
  This step is used for recording bounding reference values for different center labels. Other steps having FeatBbox are for the same purpose.

Detail steps are as below:
Set
    FeatBboxLeft[Lmin]=min(FeatBboxLeft[Lmin], FeatBboxLeft[Lmax], col)
    FeatBboxRight[Lmin]=max(FeatBboxRight[Lmin], FeatBboxRight [Lmax], col)
    FeatBboxTop[Lmin]=min(FeatBboxTop[Lmin], FeatBboxTop[Lmax], row)
    FeatBboxBottom[Lmin]=min(FeatBboxBottom[Lmin], FeatBboxBottom[Lmax], row)
    FeatBboxLeft[Lmax]=FeatBboxLeft[new_label−1]
    FeatBboxRight[Lmax]=FeatBboxRight[new_label−1]
    FeatBboxTop[Lmax]=FeatBboxTop[new_label−1]
    FeatBboxBottom[Lmax]=FeatBboxBottom[new_label−1]
    FeatBboxLeft[new_label−1]=0
    FeatBboxRight[new_label−1]=0
    FeatBboxTop[new_label−1]=0
    FeatBboxBottom[new_label−1]=0
Step 140
    Set
    num_blob=num_blob−1
    new_label=new_label−1
Step 141
    Set
    FeatSize[Lj]=FeatSize[Lj]+1
Step 142
    Set
    FeatCent[Lj]=FeatCent[Lj]+[row, col]
Step 143
    Determine if FeatSize[Lj] is 1, go to step 146 if the answer is yes, and go to step 145 if the answer is no.
Step 144
    Set
    FeatBboxLeft[Lj]=col
    FeatBboxRight[Lj]=col
    FeatBboxTop[Lj]=row
    FeatBboxBottom[Lj]=row
Step 145
    Set
    FeatBboxLeft[Lj]=min(FeatBboxLeft[Lj],col)
    FeatBboxRight[Lj]=max(FeatBboxRight[Lj],col)
    FeatBboxTop[Lj]=min(FeatBboxTop[Lj],row)
    FeatBboxBottom[Lj]=max(FeatBboxBottom[Lj],row)
Step 146
    Record Lj to label buffer
Step 147
    Determine if the current pixel is the last pixel, go to step 149 if the answer is yes, and go to step 148 if the answer is no.
Step 148
    Set P=a pixel value of a next pixel, and goes back to the step 104 to process next pixel.
Step 149
    End As stated above, FIG. 5-FIG. 10 are schematic diagrams illustrating examples of the CCA method illustrated in FIG. 1-FIG. 4. In FIG. 5-FIG. 10, the binary input image means the target binary image, the label buffer is the above-mentioned label buffer, and the feature table (area) is for recording numbers respectively for different center labels [Similar comment for Step 137]. The feature table (Centroid) is for recording centroid reference values for different center labels. The feature table (Bounding Box) is for recording bounding reference values for different center labels. Also, (Rx,Cy) means a current pixel being processed is at a x-th row and a y-th column and a corresponding address of the label buffer.

The steps in FIG. 5-FIG. 10 are stated as below. Please note, the results of these steps can be acquired following the flow illustrated in FIG. 1-FIG. 4, thus only brief descriptions thereof are provided.

Figure 5:
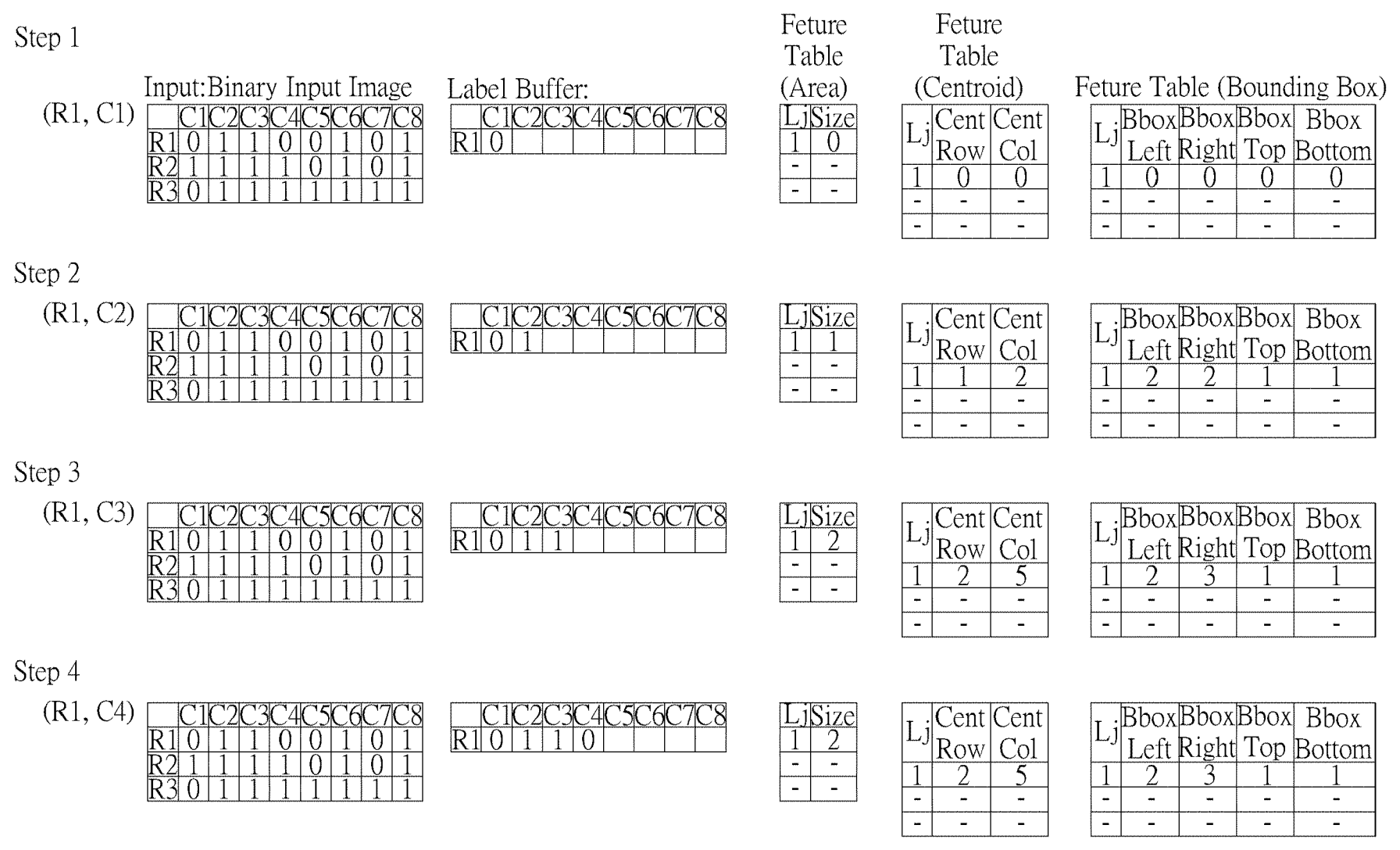

FIG. 5 comprises following steps:
Step 1
    The pixel at (R1, C1) has a pixel value of 0, thus Lj=0 and Lj is stored to the label buffer (R1, C1). It also means the pixel at (R1, C1) is marked by the center label 0.
    Feature table (area), the feature table (Centroid) and feature table (Bounding Box) are correspondingly set to be 0. For more detail, all feature tables value are reset or initialized to 0 for every new image, before the first pixel is processed. Therefore, in this steps, the pixel at (R1, C1) has a pixel value of 0, thus feature tables (already initialized to 0) will not be updated.
Step 2
    (a) The pixel at (R1, C1) has a pixel value of 1.
    The current pixel is in first row, thus La=Lb=Lc=0.
    (b) The current pixel is not in a first column or a last column, La=Top Left Label=predetermine value=0, Lc=Top Right Label=predetermine value=0, Ld=left label=0.
    In the step 2, Top Left Label and Top Right Label of the center label 1 do not exist, thus La, Lc are set to a predetermined value 0.
    (c) Since La=Lb=Lc=0
    Lj=new label=1, the new_label here is an initial new_label.
    new_label=new_label+1=2
    new_label is less than a max_label, so new_label=2. In this step, the max_label is an initial value 4, thus the new_label 2 is less than the max_label.
    For more detail, the max_label refers to the maximum number of label and it depends on the memory size allocated for feature tables. Bigger max_label meaning bigger memory size is required to store more labels (1 label for each object/blob). For this particular target binary image example, max_label has to be set to minimally 4 in order to process the image correctly. Any new_label that is greater than 4 will be clipped to 4. By using max_label of 4 for this example, each feature table(size, centroid and bounding box) will be able to store information for up to 3 objects/blobs.
    num_of_object=num_of_object+1=0+1=1
    num_of_object is the num_of_blob in FIG. 1-FIG. 4.
    (d) No collision occurs
    Size[1]=Size[1]+1=1, the initial Size[1]=0. The Size[ ] means the FeatSize[ ] in the steps of FIG. 1-FIG. 4.
    FeatCent[1]=FeatCent[1]+[1,2]=[1,2], the initial FeatCent[1]=0.
    Size[1]=1, then
    BboxLeft[1]=Col=2
    BboxRight[1]=Col=2
    BboxTop[1]=Row=1
    BboxBottom[1]=Row=1
    (e) Record Lj=1 to label buffer (R1, C1)
Step 3
    (a) The pixel at (R1, C3) has a pixel value of 1.
    The current pixel is in a first row, thus La=Lb=Lc=0.
    (b) The current pixel is not in a first column or a last column, La=Top Left Label=predetermine value=0, Lc=Top Right Label=predetermine value=0, Ld=left label=1.

(c) Lj=Ld=1
(d) No collision occurs
Size[1]=Size[1]+1=2.
FeatCent[1]=FeatCent[1]+[1,3]=[1,2]+[1,3]=[2,5]
BboxLeft[1]=min(BboxLeft[1], col)=min(2,3)=2
BboxRight[1]=max(BboxRight[1], col)=max(2,3)=2
BboxTop[1]=min(BboxTop[1], row)=min(1,1)=1
BboxBottom[1]=max(Bboxbottom[1], row)=max(1,1)=1
(e) Record Lj=1 to label buffer (R1, C3)

Step 4

The pixel at (R1, C4) has a pixel value of 0, thus Lj=0 and Lj is stored to the label buffer (R1, C4). Feature table (area), the feature table (Centroid) and feature table (Bounding Box) are not changed.

Figure 6:
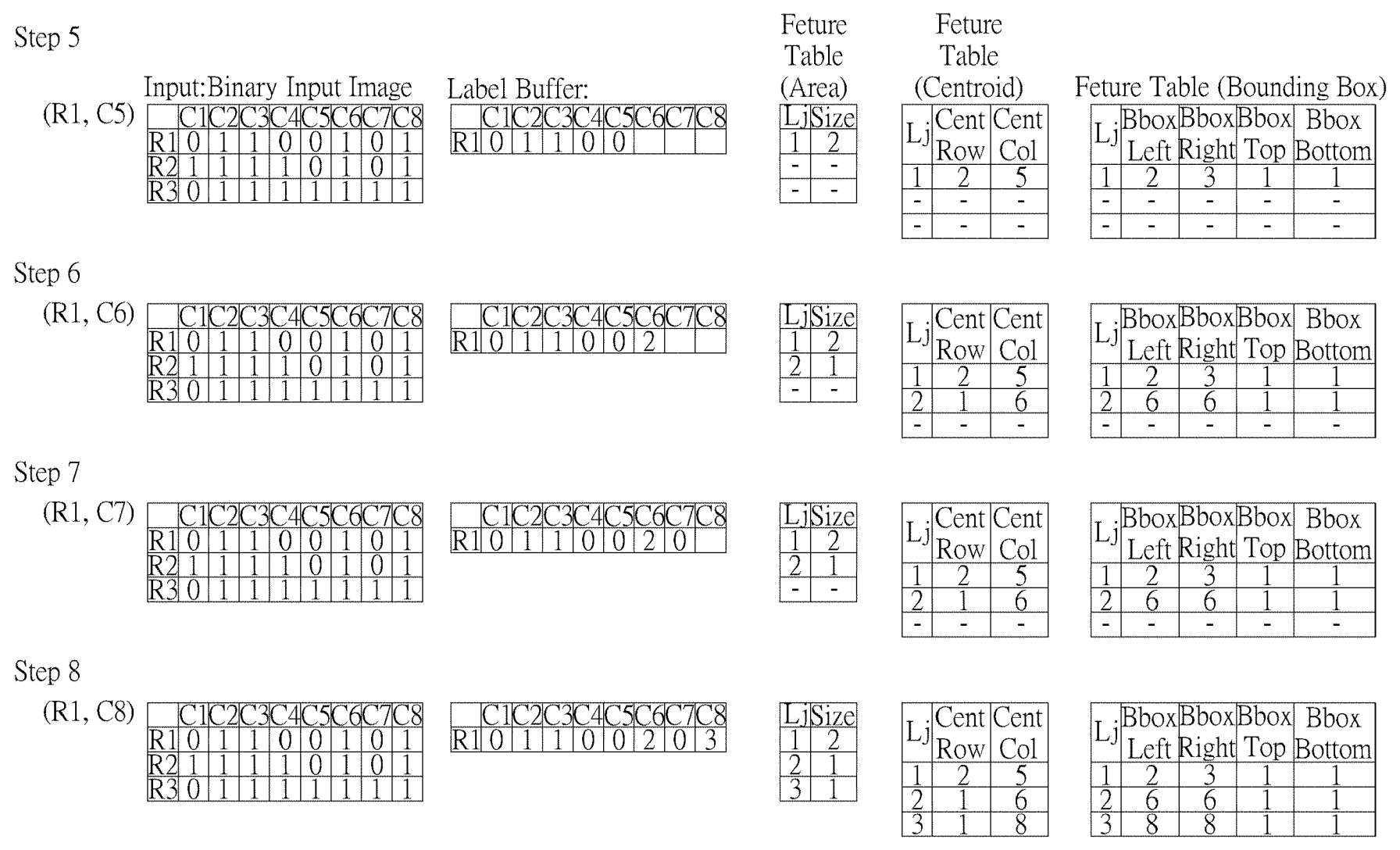

FIG. 6 comprises following steps:

Step 5

The pixel at (R1, C5) has a pixel value of 0, thus Lj=0 and Lj is stored to the label buffer (R1, C5). Feature table (area), the feature table (Centroid) and feature table (Bounding Box) are not changed.

Step 6

(a) The pixel at (R1, C6) has a pixel value of 1.
The current pixel is in first row, thus La=Lb=Lc=0.
(b) The current pixel is not in a first column or a last column, La=Top Left Label=predetermine value=0, Lc=Top Right Label=predetermine value=0, Ld=left label=Label buffer (R1,C6)=0.
(c) Since La=Lb=Lc=0
Lj=new_label=2
new_label=new_label+1=2+1=3
new_label is less than a max_label, so new label=3
num_of_object=num_of_object+1=1+1=2
(d) No collision occurs
Size[2]=Size[2]+1=1, the initial Size[2]=0.
FeatCent[2]=FeatCent[2]+[1,6]=[1,6], the initial FeatCent[2]=0.
Size[2]=1, then
BboxLeft[2]=Col=6
BboxRight[2]=Col=6
BboxTop[2]=Row=1
BboxBottom[2]=Row=1
(e) Record Lj=2 to label buffer (R1, C6)

Step 7

The pixel at (R1, C7) has a pixel value of 0, thus Lj=0 and Lj is stored to the label buffer (R1, C7). Feature table (area), the feature table (Centroid) and feature table (Bounding Box) are not changed.

Step 8

(a) The pixel at (R1, C8) has a pixel value of 1.
The current pixel is in a first row, thus La=Lb=Lc=0.
(b) The current pixel is in a last column, La=Top Left Label=predetermine value=0, Lc=0, Ld=left label=Label buffer (R1, C7)=0.
(c) Since La=Lb=Lc=Ld=0
Lj=new_label=3
new_label=new_label+1=3+1=4
new_label is less than a max_label, so new_label=4
[Same comment for Step 2 (c) above]
num_of_object=num_of_object+1=2+1=3
(d) No collision occurs
Size[3]=Size[3]+1=1, the initial Size[3]=0.
FeatCent[3]=FeatCent[3]+[1,8]=[1,8]. The initial FeatCent[3]=0.
Size[3]=1, then
BboxLeft[2]=Col=8
BboxRight[2]=Col=8
BboxTop[2]=Row=1
BboxBottom[2]=Row=1
(e) Record Lj=3 to label buffer (R1, C8)

Figure 7:
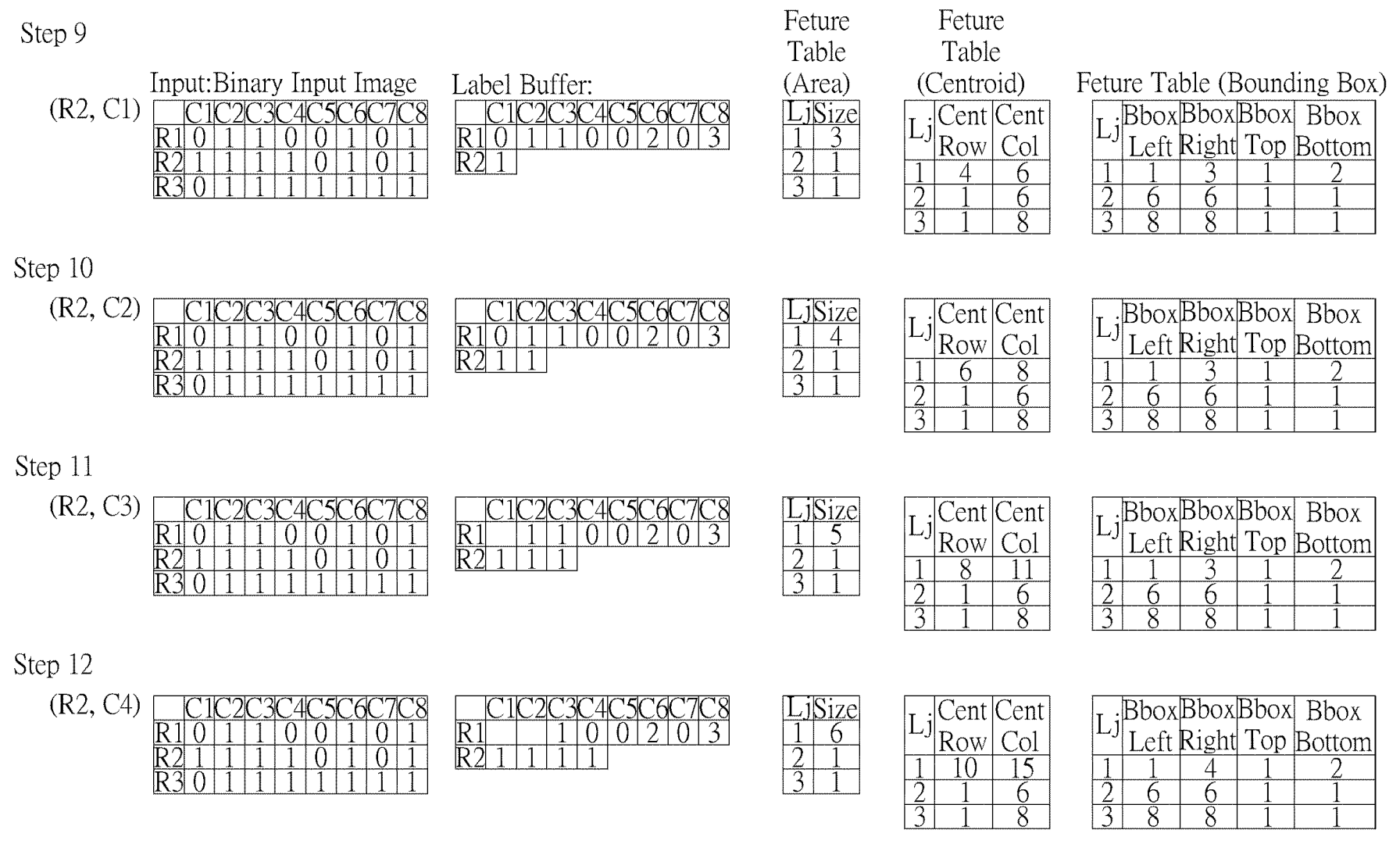

FIG. 7 comprises following steps:

Step 9

(a) The pixel at (R2, C1) has a pixel value of 1.
Lb=Top label=Label buffer (R1, C1)=0.
(b) The current pixel is not in a first row but in a first column, thus La=0, Lc=Top Right label=Label buffer (R1, C1)=1, Ld=0.
(c) Lc>0, Lj=Lc=1
(d) No collision occurs
Size[1]=Size[1]+2=3
FeatCent[1]=FeatCent[1]+[2,1]=[2,5]+[2,1]=[4,6].
BboxLeft[1]=min(BboxLeft[1], col)=min(2,1)=1
BboxRight[1]=max(BboxRight[1], col)=max(3,1)=3
BboxTop[1]=min(BboxTop[1], row)=min(1,2)=1
BboxBottom[1]=max(Bboxbottom[1], row)=max(1,2)=2
(e) Record Lj=1 to label buffer (R2, C1)

Step 10

(a) The pixel at (R2, C2) has a pixel value of 1.
Lb=Top label=Label buffer (R1, C1)=1.
(b) The current pixel is not in first row and not in first column, thus La=Top Left label=Label buffer (R1, C1)=0, Lc=Top Right label=Label buffer (R1, C3)=1, Ld=Left label=Label buffer (R2, C1)=1.
(c) Lc>0 and Ld>0, and Lc=Ld
Lj=Lc=1
(d) No collision occurs
Size[1]=Size[1]+1=3+1=4
FeatCent[1]=FeatCent[1]+[2,2]=[4,6]+[2,2]=[6,8].
BboxLeft[1]=min(BboxLeft[1], col)=min(1,2)=1
BboxRight[1]=max(BboxRight[1], col)=max(3,2)=3
BboxTop[1]=min(BboxTop[1], row)=min(1,2)=1
BboxBottom[1]=max(Bboxbottom[1], row)=max(2,2)=2
(e) Record Lj=1 to label buffer (R2, C2)

Step 11

(a) The pixel at (R2, C3) has a pixel value of 1.
Lb=Top label=Label buffer (R1, C3)=1.
(b) The current pixel is not in first row and not in first column, thus La=Top Left label=Label buffer (R1, C1)=1, Lc=Top Right label=Label buffer (R1, C4)=0, Ld=Left label=Label buffer (R2, C2)=1.
(c) La>0
Lj=La=1
(d) No collision occurs
Size[1]=Size[1]+1=4+1=5
FeatCent[1]=FeatCent[1]+[2,3]=[6,8]+[2,3]=[8,11].
BboxLeft[1]=min(BboxLeft[1], col)=min(1,3)=1
BboxRight[1]=max(BboxRight[1], col)=max(3,3)=3
BboxTop[1]=min(BboxTop[1], row)=min(1,2)=1
BboxBottom[1]=max(Bboxbottom[1], row)=max(2,2)=2
(e) Record Lj=1 to label buffer (R2, C3)

Please note, in the embodiment of FIG. 5-FIG. 10, the size of the label buffer is a number of column+1, thus is 9.

Therefore, from step 11, the previously recorded labels are removed such that the label buffer stores only 9 labels.

Step 12

The rules of step 12 are similar with which of step 11, thus are omitted for brevity here.

Figure 8:
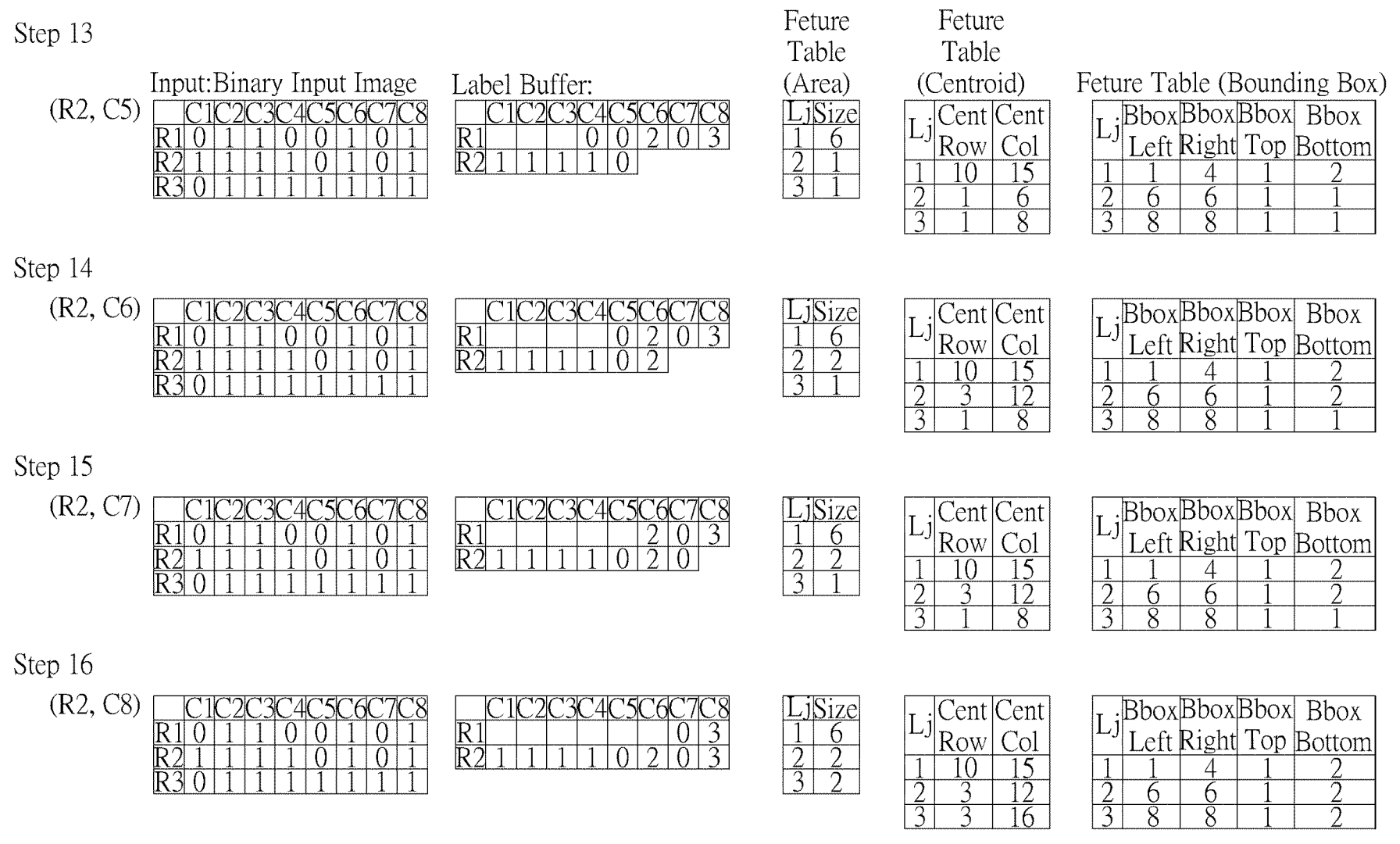

FIG. 8 comprises following steps:

Step 13

The rules of step 13 are similar with which of the step 4, thus are omitted for brevity here.

Step 14

(a) The pixel at (R2, C6) has a pixel value of 1.
Lb=Top label=Label buffer (R1, C6)=2.

(b) The current pixel is not in first row and not in first column, thus La=Top Left label=Label buffer (R1, C5)=0, Lc=Top Right label=Label buffer (R1, C7)=0, Ld=Left label=Label buffer (R2, C5)=0.
(c) Lb>0
Lj=Lb=2
(d) No collision occurs
Size[2]=Size[2]+1=1+1=2
FeatCent[2]=FeatCent[2]+[2,6]=[1,6]+[2,6]=[3,12].
BboxLeft[2]=min(BboxLeft[2], col)=min(6,6)=6
BboxRight[2]=max(BboxRight[2], col)=max(6,6)=6
BboxTop[2]=min(BboxTop[2], row)=min(1,2)=1
BboxBottom[2]=max(Bboxbottom[2], row)=max(1,2)=2
(e) Record Lj=2 to label buffer (R2, C6)

Step 15

The rules of step 15 are similar with which of the step 4, thus are omitted for brevity here.

Step 16

(a) The pixel at (R2, C8) has a pixel value of 1.
Lb=Top label=Label buffer (R1, C8)=3.
(b) The current pixel is not in first row and is in a last column, thus La=Top Left label=Label buffer (R1, C7)=0, Lc=0, Ld=Left label=Label buffer (R2, C7)=0.
(c) Lb>0
Lj=Lb=3
(d) No collision occurs
Size[3]=Size[3]+1=1+1=2
FeatCent[3]=FeatCent[3]+[2,8]=[1,8]+[2,8]=[3,16].
BboxLeft[3]=min(BboxLeft[3], col)=min(8,8)=8
BboxRight[3]=max(BboxRight[3], col)=max(8,8)=8
BboxTop[3]=min(BboxTop[3], row)=min(1,2)=1
BboxBottom[3]=max(Bboxbottom[3], row)=max(1,2)=2
(e) Record Lj=3 to label buffer (R2, C8)

Figure 9:
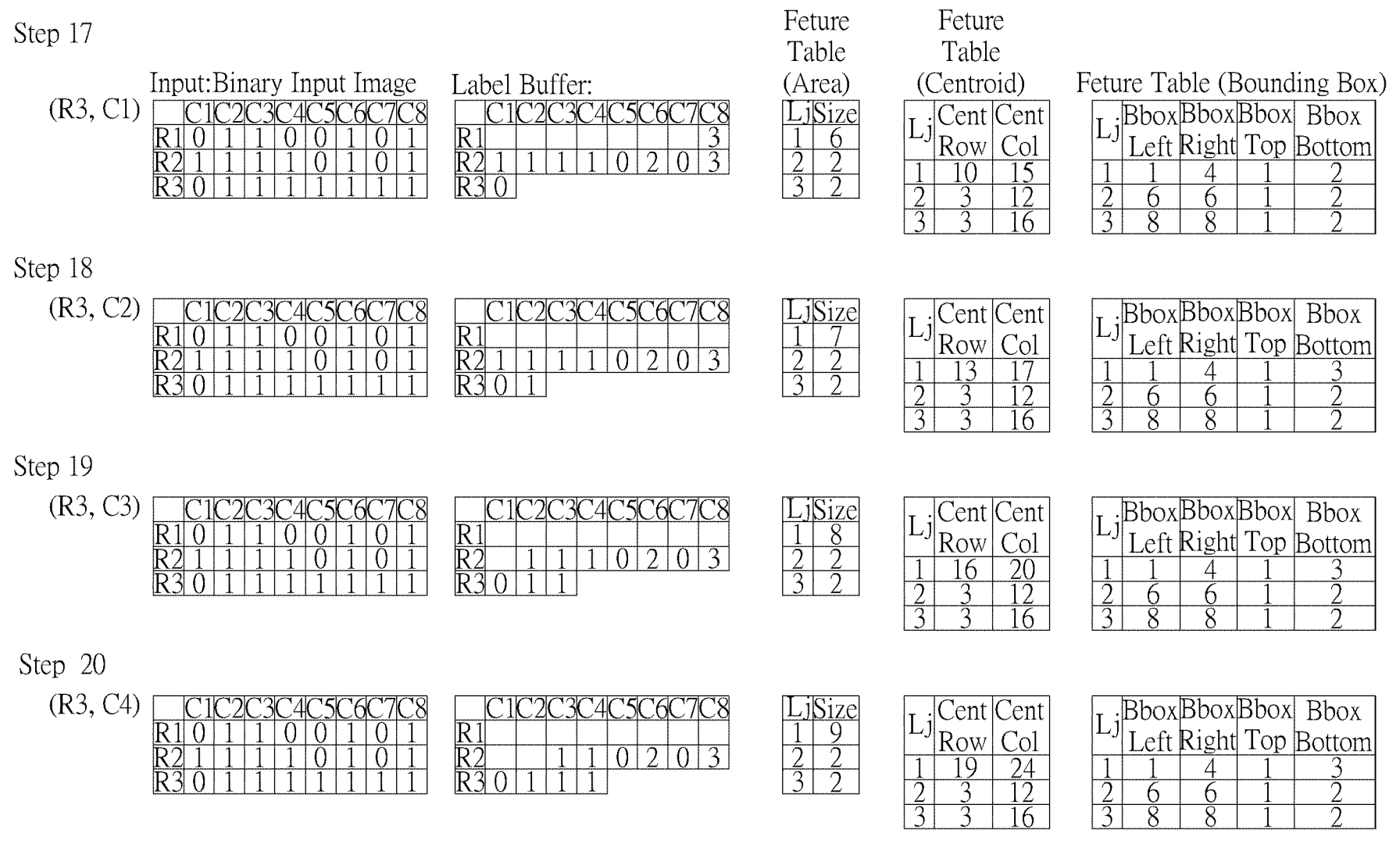

FIG. 9 comprises following steps:

Step 17

The rules of step 17 are similar with which of the step 1, thus are omitted for brevity here.

Step 18

(a) The pixel at (R3, C2) has a pixel value of 1.
Lb=Top label=Label buffer (R2, C2)=1.
(b) The current pixel is not in first row and not in first column, thus La=Top Left label=Label buffer (R2, C1)=1, Lc=Top Right label=Label buffer (R2, C3)=1, Ld=Left label=Label buffer (R3, C1)=0.
(c) La>0, Lc>0, La=Lc
Lj=La=1
(d) No collision occurs
Size[1]=Size[1]+1=6+1=7
FeatCent[1]=FeatCent[1]+[3,2]=[10,15]+[3,2]=[13,17].
BboxLeft[1]=min(BboxLeft[1], col)=min(1,2)=1
BboxRight[1]=max(BboxRight[1], col)=max(4,2)=4
BboxTop[1]=min(BboxTop[1], row)=min(1,3)=1
BboxBottom[1]=max(Bboxbottom[1], row)=max(2,3)=3
(e) Record Lj=1 to label buffer (R3, C2)

Step 19

The rules of step 19 are similar with which of the step 18, thus are omitted for brevity here.

Step 20

The rules of step 20 are similar with which of the step 18, thus are omitted for brevity here.

In the steps 1-20, the center label Lj gradually increases but is less than the maximum label. Specifically, the center label Lj gradually increases from 1 to 3 but is less than 4.

Figure 10:
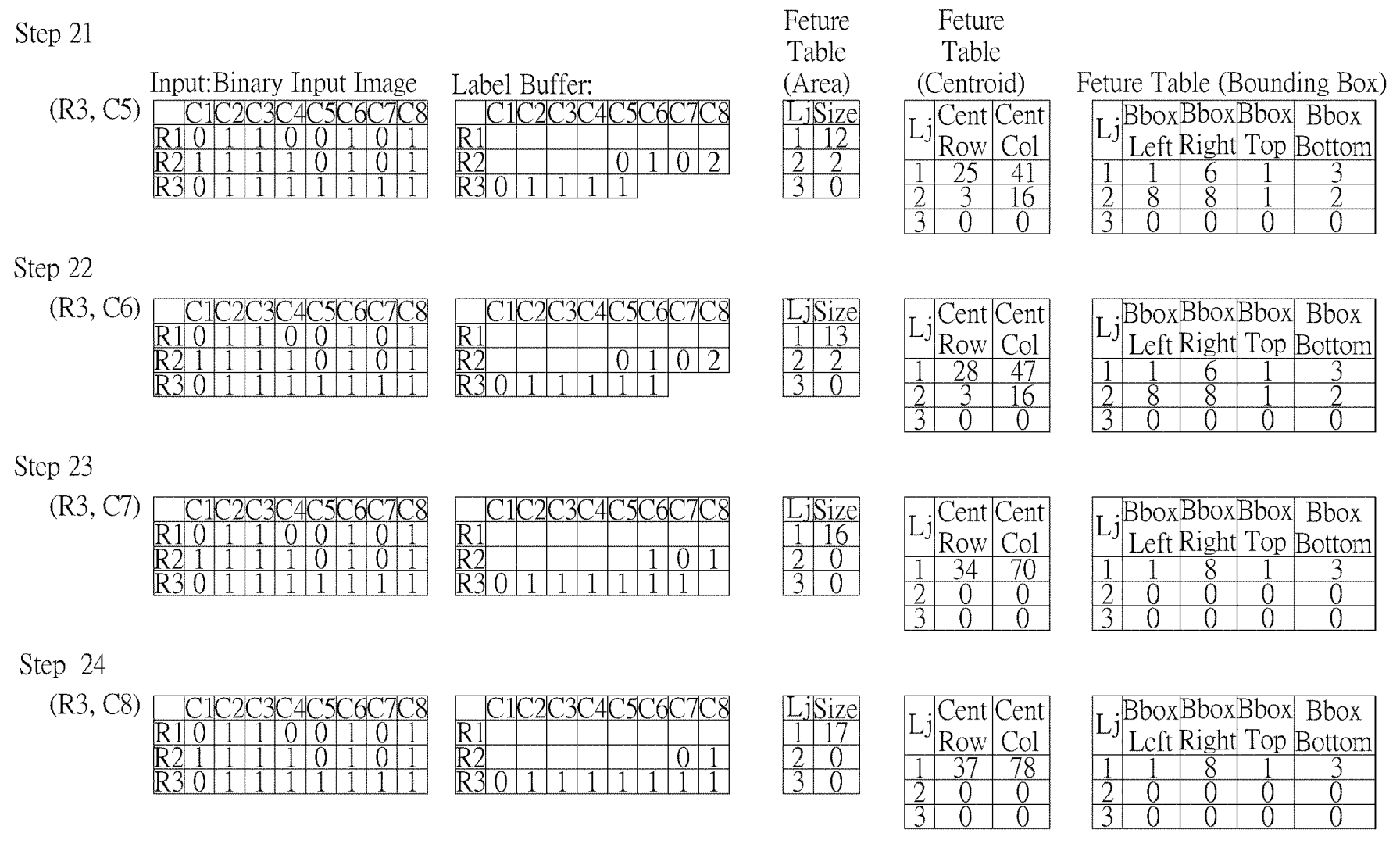

FIG. 10 comprises following steps:

Step 21

(a) The pixel at (R3, C5) has a pixel value of 1.
Lb=Top label=Label buffer (R2, C5)=0.
(b) The current pixel is not in first row and not in first column, thus La=Top Left label=Label buffer (R2, C4)=1, Lc=Top Right label=Label buffer (R2, C6)=2, Ld=Left label=Label buffer (R3, C4)=1.
(c) Lc>0, Ld>0, but Lc, Ld are different
Collision=1
Lmin=min(Lc, Ld)=1
Lmax=max(Lc,Ld)=2
(d) Collision exists
(i) Lj=Lmin=1
(ii) Replace Lmax in the label buffer with Lmin
(iii) Replace label=new_label−1 or label=3 in label buffer with Lmax or 2.
(iv) Size[Lmin]=Size[Lmin]+Size[Lmax]+1→Size[1]+Size[2]+1=9+2+1=12
Size[Lmax]=Size[new_label−1]→Size[2]=Size[3]=2
Size [new_label−1]=0→Size [3]=0
(v) FeatCent[Lmin]=FeatCent[Lmin]+FeatCent[Lmax]+[3,5]→FeatCent[1]+FeatCent[2]+[3,5]→[19,24]+[3,12]+[3,5]=[25,41]
FeatCent [Lmax]=FeatCent [new_label−1]→FeatCent [2]=FeatCent [3]=[3,16]
FeatCent [new_label−1]=04 FeatCent [3]=0
(Vi)
FeatBboxLeft[Lmin]=min(FeatBboxLeft[Lmin], FeatBboxLeft[Lmax], col)→FeatBboxLeft[1]=min(1,6,5)=1
FeatBboxRight[Lmin]=max(FeatBboxRight[Lmin], FeatBboxRight [Lmax], col)→FeatBboxRight[1]=max[4,6,5]=6
FeatBboxTop[Lmin]=min(FeatBboxTop[Lmin], FeatBboxTop[Lmax], row)→FeatBboxTop[1]=min[1,1,3]=1
FeatBboxBottom[Lmin]=min(FeatBboxBottom[Lmin], FeatBboxBottom[Lmax], row)→FeatBboxBottom[1]=max(3,2,3)=3
FeatBboxLeft[Lmax]=FeatBboxLeft[new_label−1]→FeatBboxLeft[2]=FeatBboxLeft[3]=8
FeatBboxRight[Lmax]=FeatBboxRight[new_label−1]→FeatBboxRight[2]=FeatBboxRight[3]=8
FeatBboxTop[Lmax]=FeatBboxTop[new_label−1]→FeatBboxTop[2]=FeatBboxTop[3]=1
FeatBboxBottom[Lmax]=FeatBboxBottom[new_label−1]→FeatBboxBottom[2]=FeatBboxBottom [3]=2
FeatBboxLeft[new_label−1]=0→FeatBboxLeft[3]=0
FeatBboxRight[new_label−1]=0→FeatBboxRight[3]=0
FeatBboxTop[new_label−1]=0→FeatBboxTop[3]=0
FeatBboxBottom[new_label−1]=0→BeatBboxBottom [3]=0
(vii)
new_label=new_label−1=4−1=3
(viii)
num_of_object=number_of_object−1=3−1=2
(ix)
(e) Record Lj=1 to label buffer (R3, C5)

In the step 21, the pixel which is marked by the label 3 is changed to the label 1, thus the Feature Table (Area), Feature Table (Centroid) and the Feature Table (Bounding Box) are correspondingly changed. Therefore, in the step 21, the label 1 is reused.

Step 22

(a) The pixel at (R3, C6) has a pixel value of 1.
Lb=Top label=Label buffer (R2, C6)=1.
(b) The current pixel is not in first row and not in first column, thus La=Top Left label=Label buffer (R2, C5)=0, Lc=Top Right label=Label buffer (R2, C7)=0, Ld=Left label=Label buffer (R3, C5)=1.
(c) Lb>0
Lj=Lb=1
(d)No collision occurs
Size[1]=Size[1]+1=1+1=2
FeatCent[1]=FeatCent[1]+[3,6]=[25,41]+[3,6]=[28,47].
BboxLeft[1]=min(BboxLeft[1], col)=min(1,6)=1
BboxRight[1]=max(BboxRight[1], col)=max(6,6)=6
BboxTop[1]=min(BboxTop[1], row)=min(1,3)=1
BboxBottom[1]=max(Bboxbottom[1], row)=max(3,3)=3
(e) Record Lj=1 to label buffer (R3, C6)
Step 23
(a) The pixel at (R3, C7) has a pixel value of 1.
Lb=Top label=Label buffer (R2, C7)=0.
(b) The current pixel is not in first row and not in first column, thus La=Top Left label=Label buffer (R2, C6)=1, Lc=Top Right label=Label buffer (R2, C8)=2, Ld=Left label=Label buffer (R3, C6)=1.
(c)La>0, Lc>0, but La, Lc are different
Collision=1
Lmin=min(Lc, Ld)=1
Lmax=max (Lc, Ld)=2
(d) Collision exists
(i) Lj=Lmin=1
(ii) Replace Lmax in the label buffer with Lmin
(iii) Replace label=new_label−1 or label=2 in label buffer with Lmax or 2.
(iv)Size[Lmin]=Size[Lmin]+Size[Lmax]+1→Size[1]+Size[2]+1=13+2+1=16
Size[Lmax]=Size[new_label−1]→Size[2]=2
Size [new_label−1]=0→ Size [2]=0
(v) FeatCent[Lmin]=FeatCent[Lmin]+FeatCent[Lmax]+[3,7]→FeatCent[1]+FeatCent[2]+[3,7]→[28,47]+[3,16]+[3,7]=[34,70]
FeatCent [Lmax]=FeatCent [new_label−1]→FeatCent [2]=FeatCent [3]=[3,16]
FeatCent [new_label−1]=0→FeatCent [2]=0
(Vi)
FeatBboxLeft[Lmin]=min(FeatBboxLeft[Lmin], FeatBboxLeft[Lmax], col)→FeatBboxLeft[1]=min(1,8,7)=1
FeatBboxRight[Lmin]=max(FeatBboxRight[Lmin], FeatBboxRight [Lmax], col)→FeatBboxRight[1]=max[6,8,7]=8
FeatBboxTop[Lmin]=min(FeatBboxTop[Lmin], FeatBboxTop[Lmax], row)→FeatBboxTop[1]=min[1,1,3]=1
FeatBboxBottom[Lmin]=min(FeatBboxBottom[Lmin], FeatBboxBottom[Lmax], row)→FeatBboxBottom[1]=max(3,2,3)=3
FeatBboxLeft[Lmax]=FeatBboxLeft[new_label−1]→ FeatBboxLeft [2]=8
FeatBboxRight[Lmax]=FeatBboxRight[new_label−1]→FeatBboxRight[2]=8
FeatBboxTop[Lmax]=FeatBboxTop[new_label−1]→ FeatBboxTop[2]=1
FeatBboxBottom[Lmax]=FeatBboxBottom[new_label−1]→FeatBboxBottom[2]=2
FeatBboxLeft[new_label−1]=0→FeatBboxLeft[2]=0
FeatBboxRight[new_label−1]=0→FeatBboxRight[2]=0
FeatBboxTop[new_label−1]=0→FeatBboxTop[2]=0
FeatBboxBottom[new_label−1]=0→BeatBboxBottom[2]=0
(vii)
new_label=new_label−1=3−1=2
(viii)
num_of_object=number_of_object−1=2−1=1
(xi)
(e) Record Lj=1 to label buffer (R3, C7)
In the step 23, the pixel which is marked by the label 2 is changed to the label 1, thus the Feature Table (Area), Feature Table (Centroid) and the Feature Table (Bounding Box) are correspondingly changed.
Step 24
(a) The pixel at (R3, C8) has a pixel value of 1.
Lb=Top label=Label buffer (R2, C8)=1.
(b) The current pixel is not in first row and is in a last column, thus La=Top Left label=Label buffer (R2, C7)=0, Lc=0, Ld=Left label=Label buffer (R3, C7)=1.
(c) Lb>0
Lj=Lb=1
(d)No collision occurs
Size[1]=Size[1]+1=16+1=17
FeatCent[1]=FeatCent[1]+[3,8]=[34,70]+[3,8]=[37,78].
BboxLeft[1]=min(BboxLeft[1], col)=min(1,8)=1
BboxRight[1]=max(BboxRight[1], col)=max(8,8)=8
BboxTop[1]=min(BboxTop[1], row)=min(1,3)=1
BboxBottom[1]=max(Bboxbottom[1], row)=max(3,3)=3
(e) Record Lj=1 to label buffer (R3, C8)
In the step 24, all labels are changed to 1, and the process ends since (R3, C8) is the final pixel.
Please note, in the above steps, the centroid coordinate [row,column] for the object can be computed by dividing FeatCent by FeatSize. For example, in the step 24, the centroid coordinate [row,column] for the object can be shown as Centroid [row, column] = $FeatCent/FeatSize$ = [37, 78]/17 = [2.18, 4.58]

[Actual coordinate [row,column] for each blob can be computed by dividing FeatCent by FeatSize as shown below:

Centroid [row, column] = $FeatCent/FeatSize$ = [37, 78]/17 = [2.18, 4.58]

A CCA method disclosed by above mentions embodiments can be summarized to have following steps:
defining a label pattern comprising a center label and a plurality of neighboring labels (e.g., the first label pattern LP1);
setting a label of a current pixel of a target binary image according to a binary value of the current pixel and the neighboring pixels (e.g., steps 103-120 in FIG. 1 and FIG. 2);
setting at least two of the neighboring labels according to whether the current pixel is in any one of a first row, a first column and a last column(e.g., steps 106_1, 119, 110 in FIG. 1); and
recording the center label to a label buffer;
wherein labels for marking pixels of the target binary image are first center labels, and then are second center labels, and are the first center labels again after the labels are the second center labels (e.g., pixel (R1, C1) is marked by 1 in the step 2, and then pixel (R1, C6) is marked by 2 in the step 6, and the pixel (R3, C6) is marked by 1 again in the step 22 [Same as the first comment at page 3 where we do not quite understand the first center labels and second center labels. Besides, the example for step 21 mentioned above, pixel (R2, C7) is actually 0, and (R2, C8)=1. Are these typo?].

The CCA method can further comprises at least one of following steps:

Set the center label to a new value if all of the neighboring labels are 0 (e.g., steps 122, 123 in FIG. 1).

Set the center label to the new value plus 1, if all of the neighboring labels are 0 again in a process of a next pixel (e.g., steps 123 in FIG. 2).

Set the center label to be a corresponding one of the neighboring labels if the corresponding one of the neighboring labels is larger than 0 (e.g., steps 126-129 in FIG. 2).

Limit the center label to be lower than a maximum label threshold (e.g., steps 124, 125 in FIG. 2).

Figure 3:
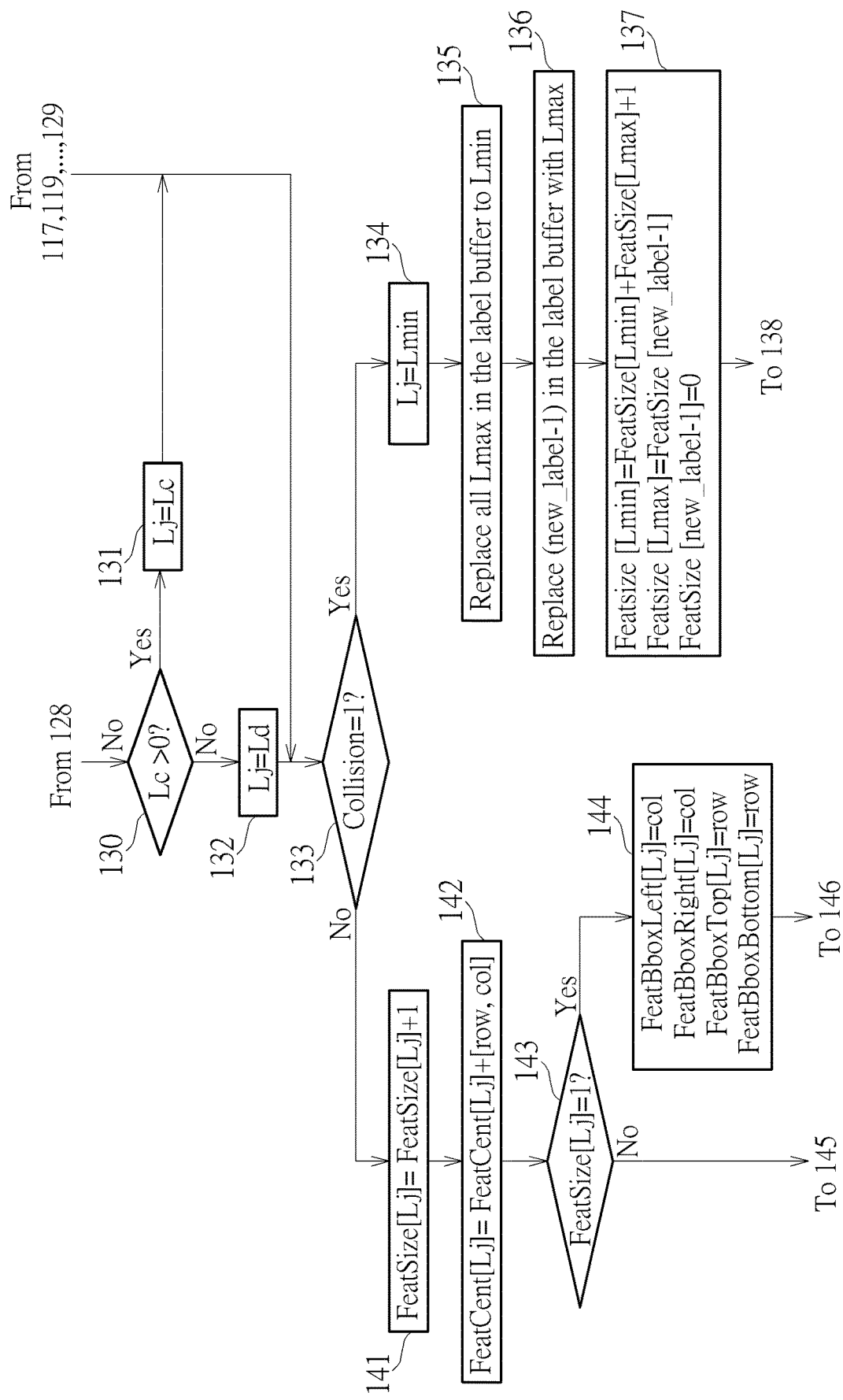
Figure 4:
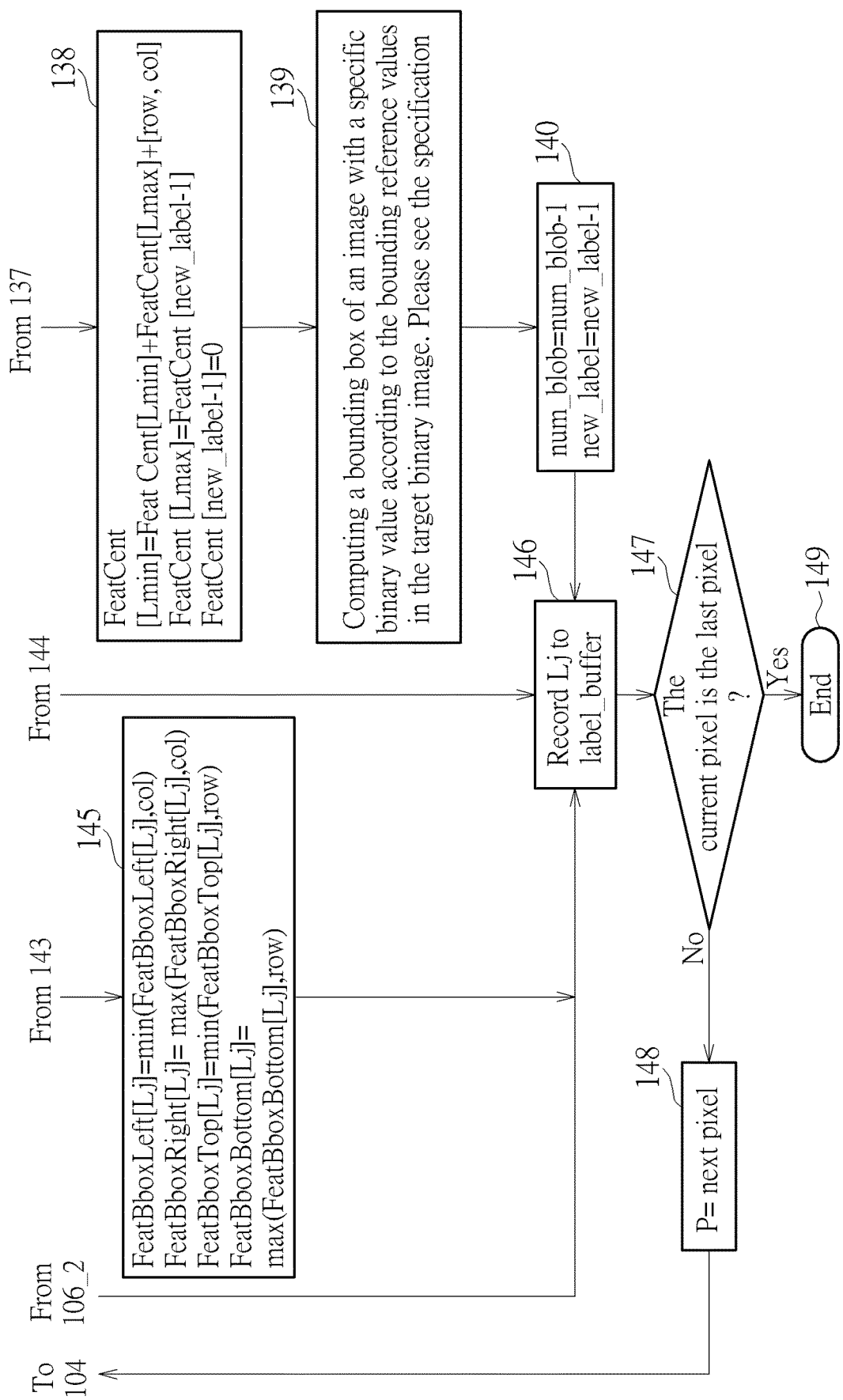
Figure 11:
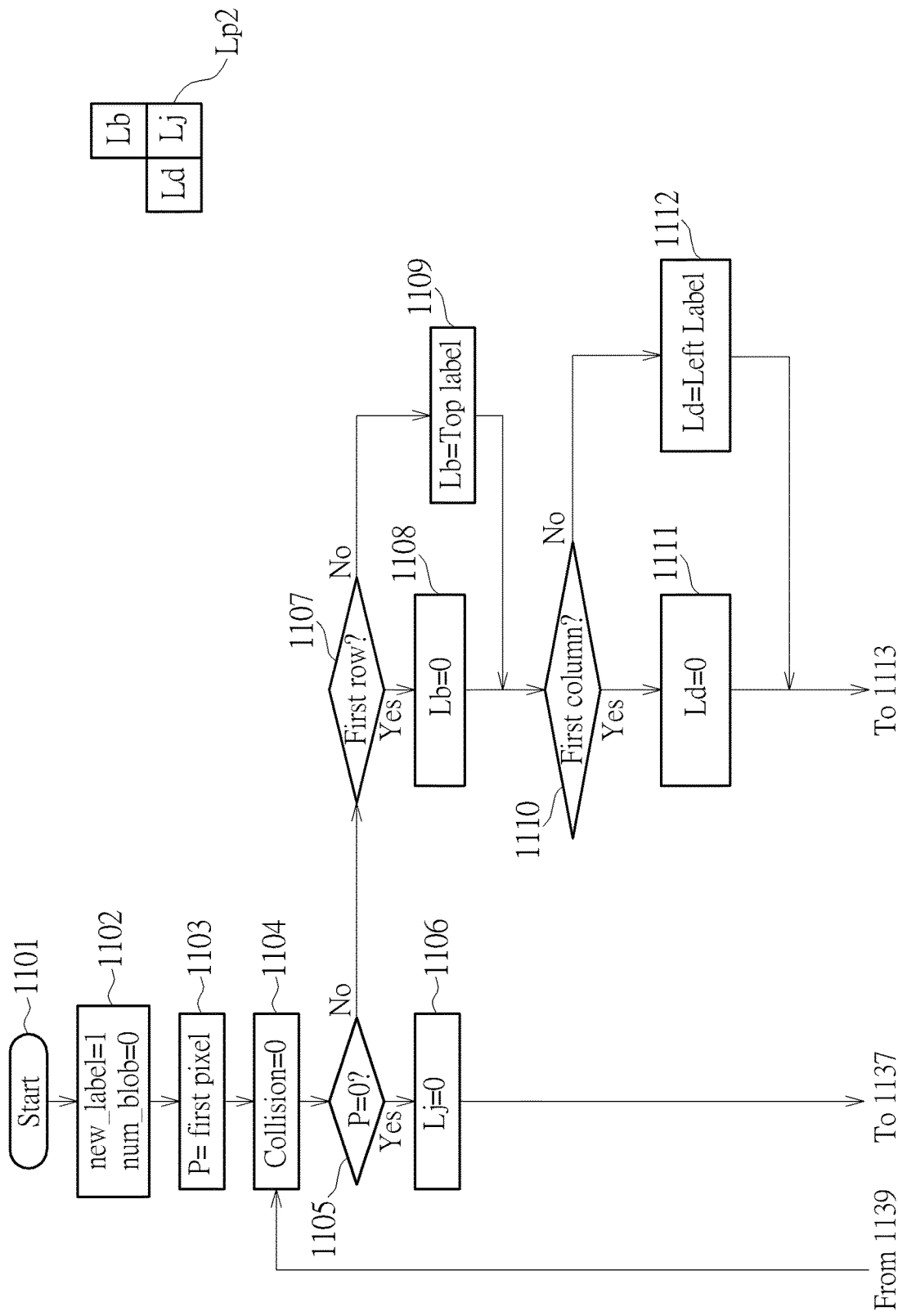
FIG. 11-FIG. 14 are schematic diagrams illustrating a CCA method according to one embodiment of the present invention.
Figure 12:
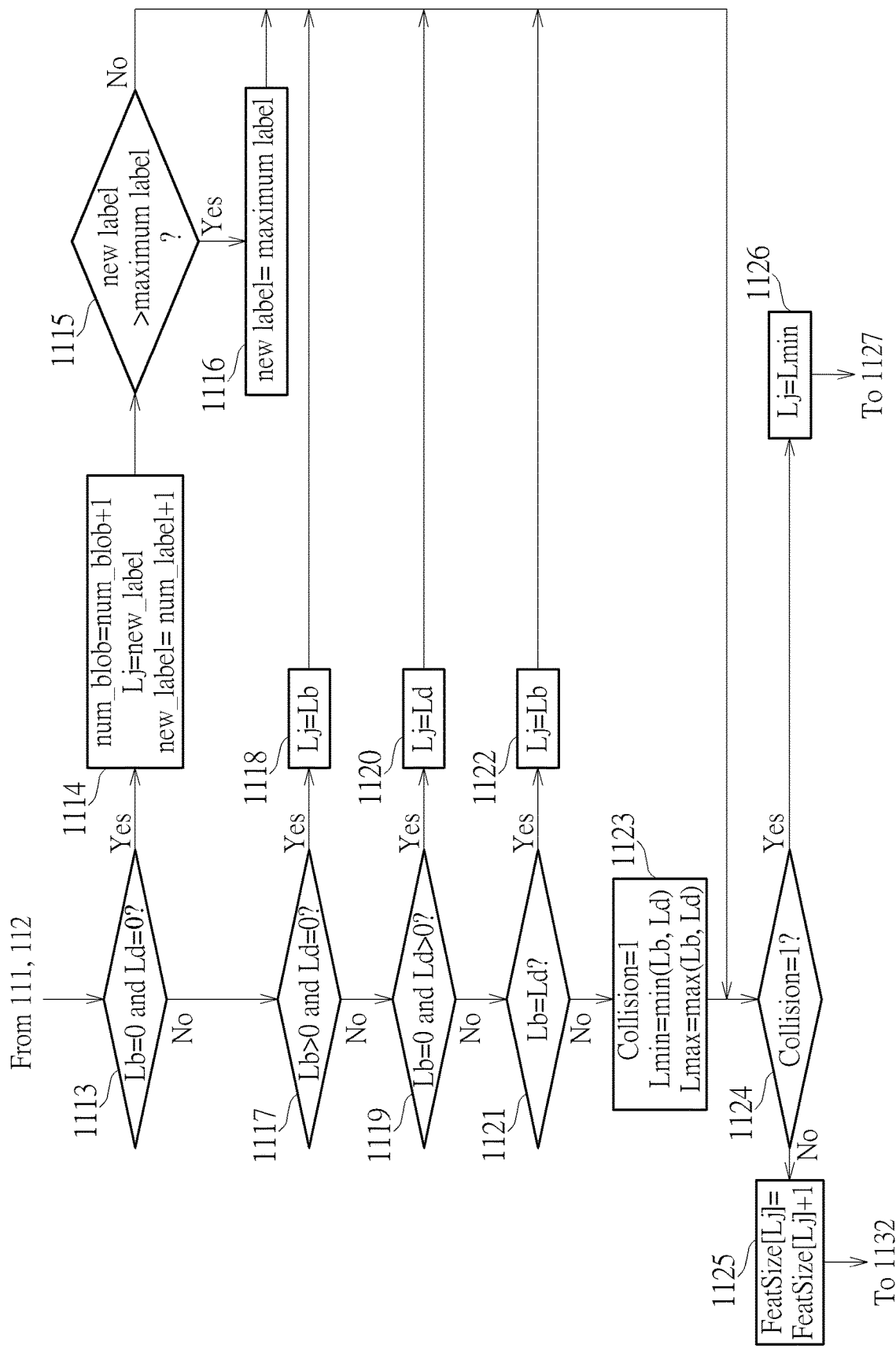
Figure 13:
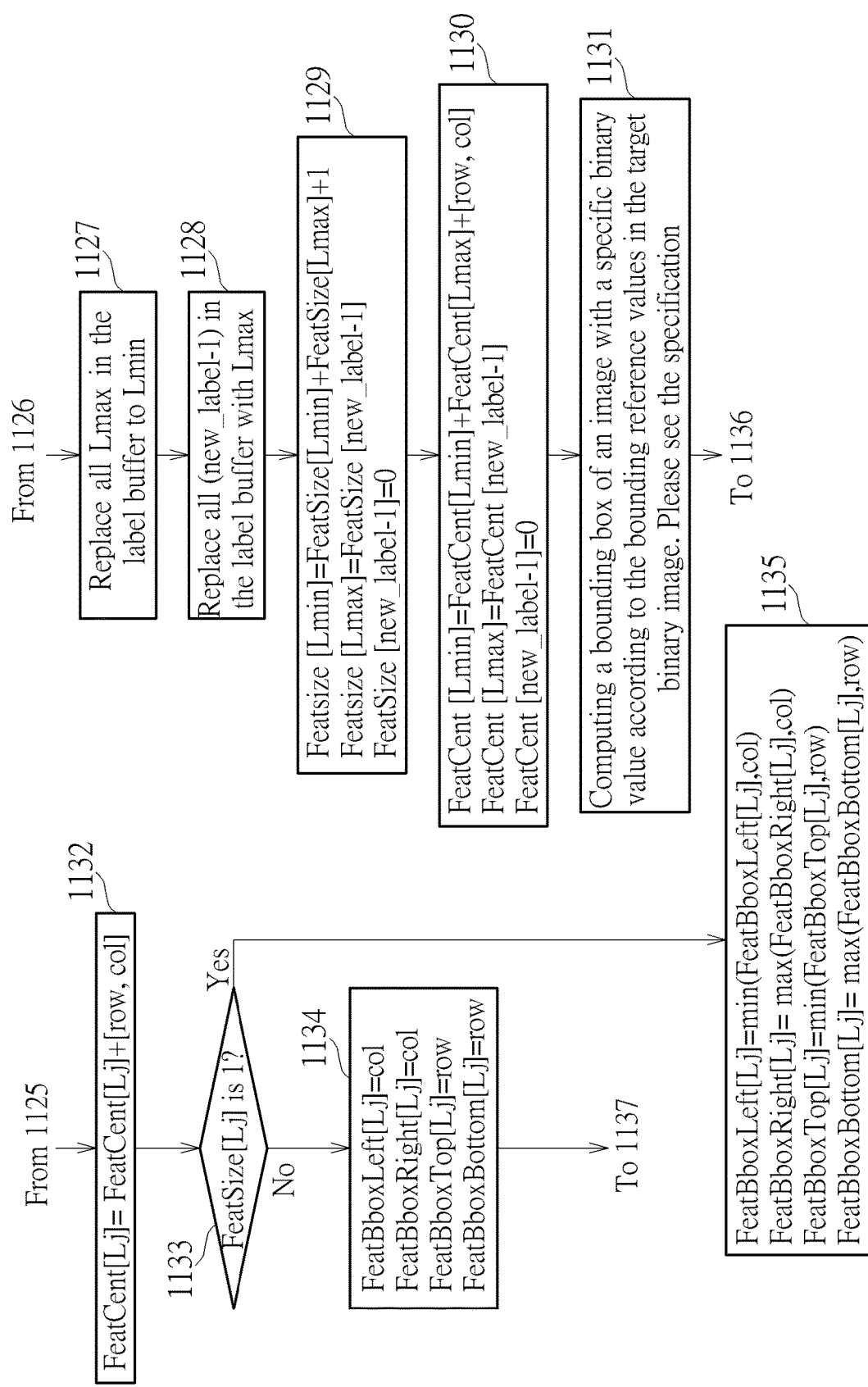
Figure 14:
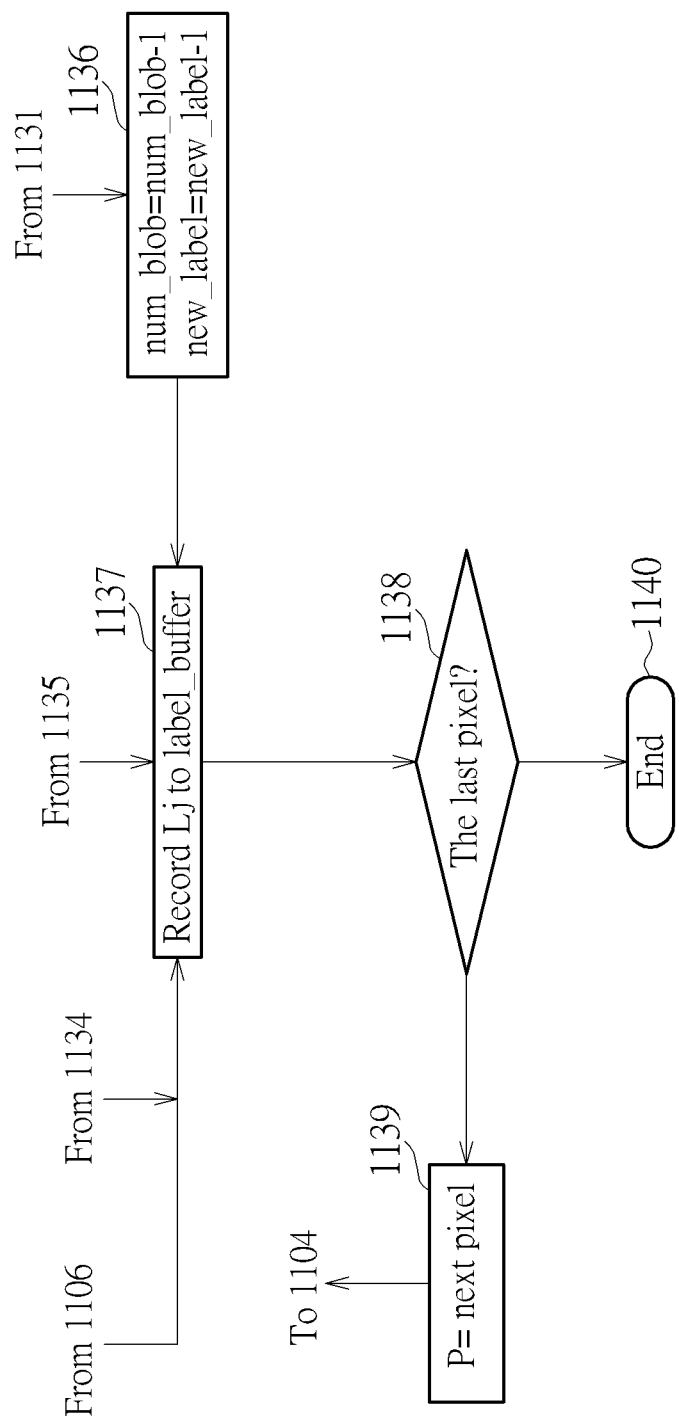

Set the center label according to whether collision of used labels occurs (e.g., step 133 in FIG. 3).

center label is set to a minimum one of specific ones of the neighboring labels when the collision occurs(e.g., step 134 in FIG. 3).

Replace the center labels recorded in the label buffer with other values according to whether collision of used labels occurs (e.g., steps 135, 136 in FIG. 3).

At least maximum one of specific ones of the neighboring labels is set to a minimum one of specific ones of the neighboring labels when the collision occurs (e.g., step 135 in FIG. 3).

Set the center label to a new value if all of the neighboring labels are 0.

The center label which is recorded in the label buffer and has a value of the new value minus one, is replaced by a maximum one of the center labels of specific ones of the neighboring labels when the collision of used labels occurs (e.g., step 136 in FIG. 3).

Besides the above-mentioned steps for computing the center label Lj, the CCA method can further comprise a step of recording numbers respectively for different center labels to compute a size of an image with a specific binary value in the target binary image (e.g, the Feature Table (Area) in FIG. 5-FIG. 10). Such step can be implemented by computing size information related with a minimum one of specific ones of the neighboring labels, a maximum one of specific ones of the neighboring labels, and a new label, to compute the size (e.g., step 137 in FIG. 3).

Also, the CCA method can further comprise a step of recording centroid reference values for different center labels; computing a centroid of an image with a specific binary value according to the centroid reference values in the target binary image. (e.g, the Feature Table (Centroid) in FIG. 5-FIG. 10). Such step can be implemented by computing centroid information related with a minimum one of specific ones of the neighboring labels, a maximum one of specific ones of the neighboring labels, and a new label, to compute the centroid (e.g., step 138 in FIG. 4).

Additionally, the CCA method can further comprise a step of recording bounding reference values for different center labels; computing a bounding box of an image with a specific binary value according to the bounding reference values in the target binary image. Such step can be implemented by computing bounding information related with a minimum one of specific ones of the neighboring labels, a maximum one of specific ones of the neighboring labels, and a new label, to compute the bounding box (e.g., step 139 in FIG. 4).

The above-mentioned rules and steps can be applied for other label patterns and target binary image. FIG. 11-FIG. 14 are schematic diagrams illustrating a CCA method according to one embodiment of the present invention. In FIG. 11-FIG. 14, a second label pattern LP2 is used, which comprises a center label Lj, and neighboring labels Lb, Ld. FIG. 11-FIG. 14 comprise following steps:

Step 1101
  Start.
Step 1102
  Set
  new_label=1
  num_blob=0
Step 1103
  Set
  P=a pixel value of the first pixel
Step 1104
  Set Collision=0
Step 1105
  Determine if P=0.
Step 1106
  Set Lj=0
Step 1107
  Determine if a current pixel is in a first row.
Step 1108
  Set Lb=0
Step 1109
  Set Lb=Top label.
Step 1110
  Determine if the current pixel is in a first column
Step 1111
  Set Ld=0
Step 1112
  Set Ld=Left Label FIG. 12 comprises following steps, which follow the steps illustrated in FIG. 11:

Step 1113
  Determine if Lb=0 and Ld=0.
Step 1114
  Set
  num_blob=num_blob+1
  Lj=new label
  new_label=num_label+1
Step 1115
  Determine if the new label (the new label set in step 1114) is larger than a maximum label.
Step 1116
  Set the new label to be a maximum label stored in the label buffer.
Step 1117
  Determine if Lb>0 and Ld=0.
Step 1118
  Set Lj=Lb
Step 1119
  Determine if Lb=0 and Ld>0.
Step 1120
  Set Lj=Ld
Step 1121
  Determine if Lb=Ld.
Step 1118
  Set Lj=Lb
Step 1123
  Set
  Collision=1
  Lmin=min(Lb, Ld)
  Lmax=max(Lb, Ld)

Step 1124
  Determine if Collision=1.
Step 1125
  Set FeatSize[Lj]=FeatSize[Lj]+1
Step 1126
  Set Lj to Lmin
Step 1127
  Replace all Lmax in the label buffer to Lmin.
Step 1128
  Replace all (new_label−1) in the label buffer with Lmax.
Step 1129
  Set Featsize [Lmin]=FeatSize[Lmin]+FeatSize[Lmax]+1
  Set Featsize [Lmax]=FeatSize [new_label−1]
  Set FeatSize [new_label−1]=0
Step 1130
  Set
  FeatCent [Lmin]=FeatCent[Lmin]+FeatCent[Lmax]+[row, col] [FIG. 13: Should be FeatCent instead of FeatCen]
  FeatCent [Lmax]=FeatCent [new_label−1]
  FeatCent [new label−1]=0
Step 1131
  Set
  FeatBboxLeft[Lmin]=min(FeatBboxLeft[Lmin], FeatBboxLeft[Lmax], col)
  FeatBboxRight[Lmin]=max(FeatBboxRight[Lmin], FeatBboxRight [Lmax], col)
  FeatBboxTop[Lmin]=min(FeatBboxTop[Lmin], FeatBboxTop[Lmax], row)
  FeatBboxBottom[Lmin]=min(FeatBboxBottom[Lmin], FeatBboxBottom[Lmax], row)
  FeatBboxLeft[Lmax]=FeatBboxLeft[new_label−1]
  FeatBboxRight[Lmax]=FeatBboxRight[new_label−1]
  FeatBboxTop[Lmax]=FeatBboxTop[new_label−1]
  FeatBboxBottom[Lmax]=FeatBboxBottom[new_label−1]
  FeatBboxLeft[new_label−1]=0
  FeatBboxRight[new_label−1]=0
  FeatBboxTop[new_label−1]=0
  FeatBboxBottom[new_label−1]=0
  [FIG. 13: Step 1131 should be connected to Step 1136]
Step 1132
  Set
  FeatCent[Lj]=FeatCent[Lj]+[row, col]
Step 1133
  Determine if FeatSize[Lj] is 1.
  [FIG. 13: Should be 1133 instead of 1132]
Step 1134
  Set
  FeatBboxLeft[Lj]=col
  FeatBboxRight[Lj]=col
  FeatBboxTop[Lj]=row
  FeatBboxBottom[Lj]=row
  [FIG. 13: Should be 1134 instead of 1132]
Step 1135
  Set
  FeatBboxLeft[Lj]=min(FeatBboxLeft[Lj],col)
  FeatBboxRight[Lj]=max(FeatBboxRight[Lj],col)
  FeatBboxTop[Lj]=min(FeatBboxTop[Lj],row)
  FeatBboxBottom[Lj]=max(FeatBboxBottom[Lj],row)
Step 1136
  num_blob=num_blob−1
  new_label=new_label−1
Step 1137
  Record Lj to label buffer
Step 1138
  Determine if the current pixel is the last pixel.
Step 1139
  Set P=a pixel value of a next pixel, and goes back to the step 1104 to process next pixel. [FIG. 11: From Step 1139 to Step 1104, but arrow is pointing to Step 1105]
Step 1140
  End The meanings of all steps in FIG. 11-FIG. 14 are clearly defined in steps of FIG. 1-FIG. 10, thus are no longer repeated here.

FIG. 15 is a processing result of a binary image processed by the CCA method disclosed by the present invention. In this example, objects in the binary image 1500 are identified and minimally labeled. In other words, minimum labels are used to label the objects. For example, the object Ob1 is labeled by 1, the object Ob2 is labeled by 2 . . . and so on.

The CCA method can be applied to an image sensor comprising a sensor array (e.g., a pixel array) and a processing circuit. In such case, the sensor array outputs a binary image, wherein the binary image has M*N pixels, M>2 and N>3, such as the binary image 1500 in FIG. 15. The processing circuit receives the binary image and processes the binary image to identify at least one object in the binary image through minimally labeling at least one object. If the number of the object units (e.g., a pixel image) of the object is X, the number of a corresponding label is X. For example, the object Ob1 with 18 object units is labeled by 1 and the number of label 1 is 18. For another example, the object Ob2 with 32 object units is labeled by 2 and the number of label 2 is 32. In other words, a number of the label and a number of the object units which is labeled by the label are identical.

In view of above-mentioned embodiments, the label can be reused, and the label collision can be handled without increasing a size of the label buffer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connected component analysis method, which uses labels repeatedly, applied to an image sensor comprising a sensor array and a processing circuit, comprising:
   (a) outputting a target binary image by the sensor array, wherein the binary image has M*N pixels, M>2 and N>3;
   (b) defining a label pattern comprising a center label and a plurality of neighboring labels;
   (c) setting a label of a current pixel of the target binary image according to a binary value of the current pixel and the neighboring pixels;
   (d) setting labels of at least two of the neighboring labels according to whether the current pixel is in any one of a first row, a first column and a last column; and
   (e) recording the center label to a label buffer;
   wherein labels for marking pixels of the target binary image are first center labels, and then are second center labels, and are the first center labels again after the labels are the second center labels;
   wherein the connected component analysis method further comprises:
   performing the steps (a), (b), (c), (d) and (e) to identify at least one object in the target binary image through minimally labeling at least one object unit by the processing circuit, wherein if the number of the least one object unit is X, the number of a corresponding label is X;

wherein the minimally labeling meaning a label of the object unit is not greater than a maximum label.

2. The connected component analysis method of claim 1, further comprising:

setting the center label to a new value if all of the neighboring labels are 0.

3. The connected component analysis method of claim 2, further comprising:

setting the center label to the new value plus 1, if all of the neighboring labels are 0 again in a process of a next pixel.

4. The connected component analysis method of claim 1, further comprising:

setting the center label to be a corresponding one of the neighboring labels if the corresponding one of the neighboring labels is larger than 0.

5. The connected component analysis method of claim 1, further comprising:

limiting the center label to be lower than a maximum label threshold.

6. The connected component analysis method of claim 1, further comprising:

setting the center label according to whether collision of used labels occurs, wherein the collision means some specific ones of the neighboring labels are not 0 and are different.

7. The connected component analysis method of claim 6, wherein the center label is set to a minimum one of specific ones of the neighboring labels when the collision occurs.

8. The connected component analysis method of claim 1, further comprising:

replacing the center labels recorded in the label buffer with other values according to whether collision of used labels occurs.

9. The connected component analysis method of claim 8, wherein at least maximum one of specific ones of the neighboring labels is set to a minimum one of the specific ones of the neighboring labels when the collision occurs.

10. The connected component analysis method of claim 8, further comprising:

setting the center label to a new value if all of the neighboring labels are 0;

wherein the center label which is recorded in the label buffer and has a value of the new value minus one, is replaced by a maximum one of the specific ones of the neighboring labels when the collision of used labels occurs.

11. The connected component analysis method of claim 1, further comprising:

recording numbers respectively for different ones of the center labels.

12. The connected component analysis method of claim 11, further comprising:

computing size information related with a minimum one of specific ones of the neighboring labels, a maximum one of the specific ones of the neighboring labels, and a new label, to compute the size.

13. The connected component analysis method of claim 1, further comprising:

recording centroid reference values for different center labels.

14. The connected component analysis method of claim 13, further comprising:

computing centroid information related with a minimum one of specific ones of the neighboring labels, a maximum one of the specific ones of the neighboring labels, and a new label, to compute the centroid.

15. The connected component analysis method of claim 1, further comprising:

recording bounding reference values for different ones of the center labels.

16. The connected component analysis method of claim 15, further comprising:

computing bounding information related with a minimum one of specific ones of the neighboring labels, a maximum one of the specific ones of the neighboring labels, and a new label, to compute the bounding box.

17. The connected component analysis method of claim 1, wherein a number of bits that the label buffer can record is a number of columns of the target binary image plus 1.

* * * * *